United States Patent [19]

Yokoyama

[11] 4,126,958

[45] Nov. 28, 1978

[54] FUMIGATOR FOR MOSQUITO COIL

[76] Inventor: Yoshimasa Yokoyama, 64 Nateichiba, Naga-cho, Naga-gun, Wakayama, Japan

[21] Appl. No.: 789,707

[22] Filed: Apr. 21, 1977

[51] Int. Cl.² ............................................. A01M 13/00
[52] U.S. Cl. ........................................ 43/127; 422/239
[58] Field of Search ......................... 43/125, 127, 129; 21/111, 117

[56] References Cited

U.S. PATENT DOCUMENTS

| 1,732,028 | 10/1929 | Reiner | 43/129 |
| 2,521,942 | 9/1950 | Pearsall | 21/111 |
| 3,796,002 | 3/1974 | Katsuda | 43/125 |

FOREIGN PATENT DOCUMENTS 204,996  5/1956  Australia ................................ 43/125

Primary Examiner—Nicholas P. Godici
Assistant Examiner—Roscoe V. Parker
Attorney, Agent, or Firm—Holman & Stern

[57] ABSTRACT

The present invention provides a fumigator for mosquito coil adapted for use in suspension or by placement on a table, composed of a circular body and a similar shaped lid which can be coupled and separated, as desired, at their peripheral portions or rims with nets spread over the contacting edge surfaces thereof respectively, so that they can be formed, when coupled together, into a receptacle carrying the nets inside to hold an ignited mosquito coil therebetween.

4 Claims, 7 Drawing Figures

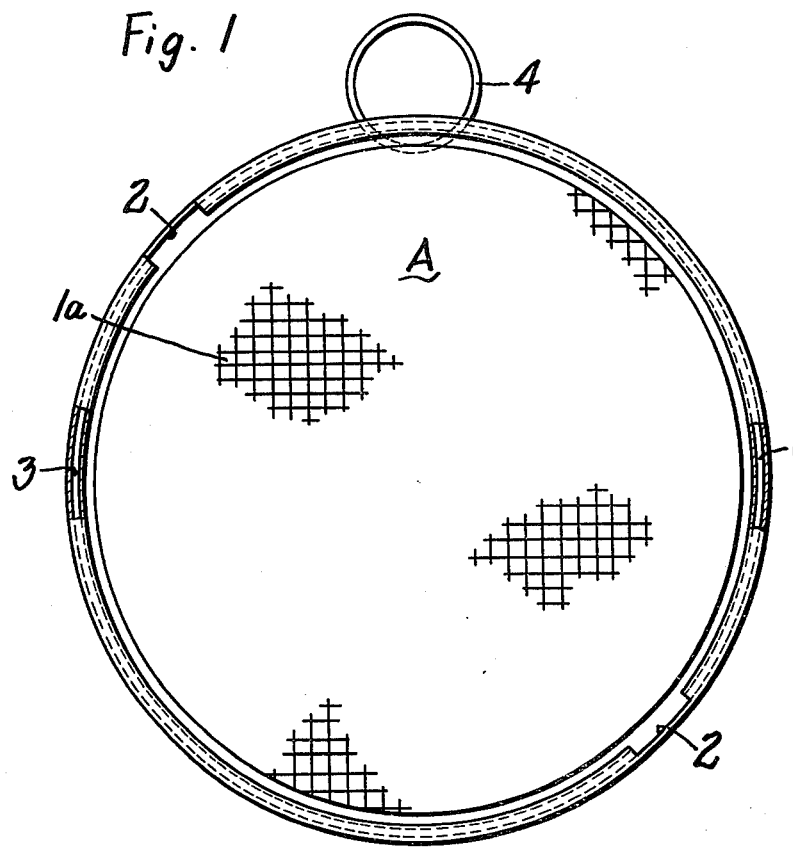
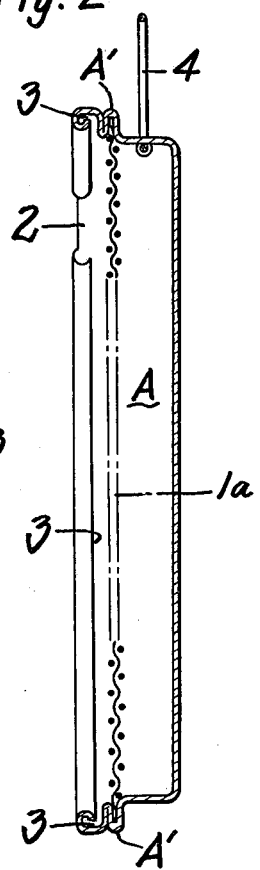
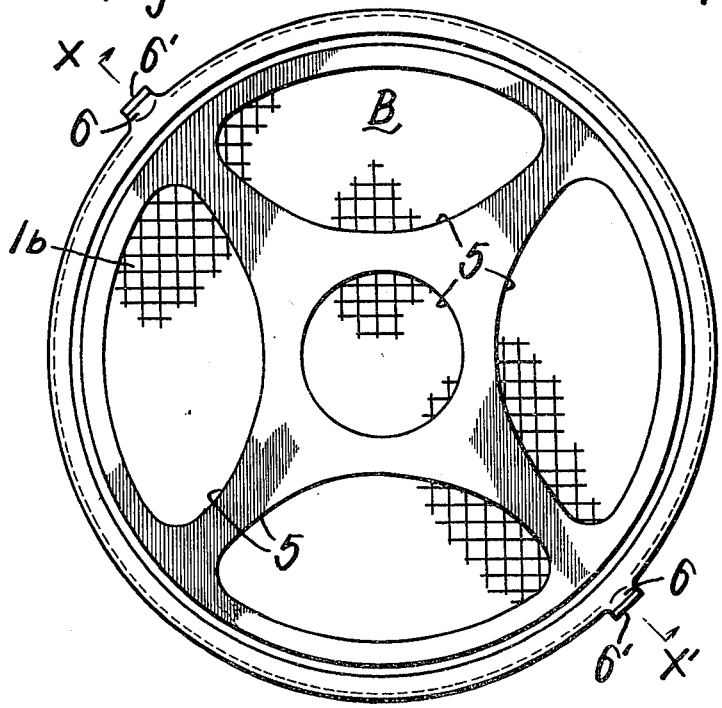
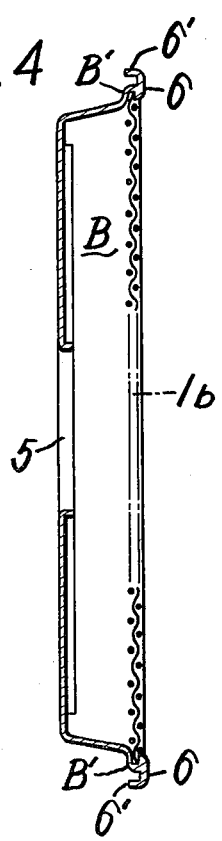

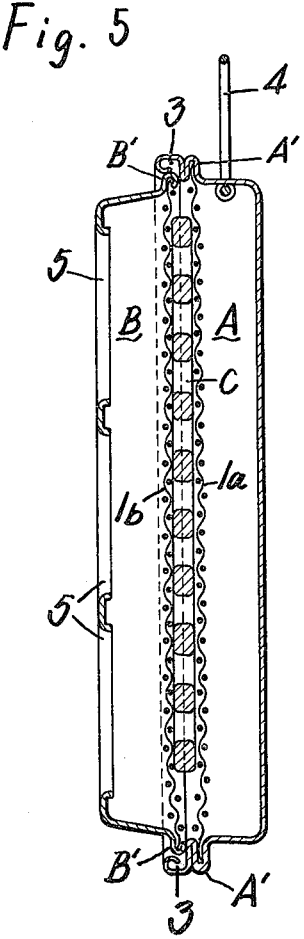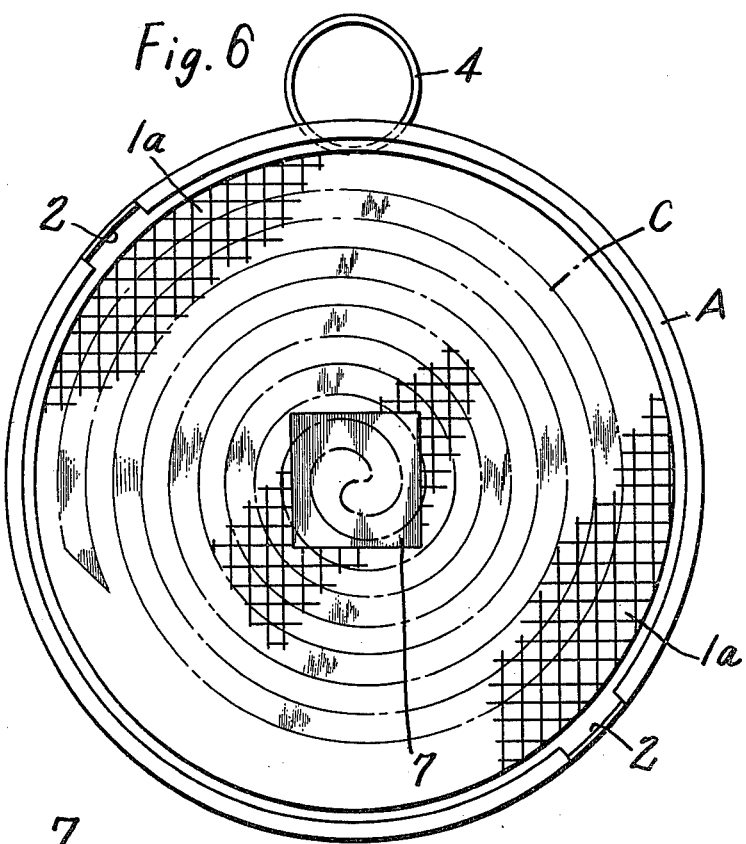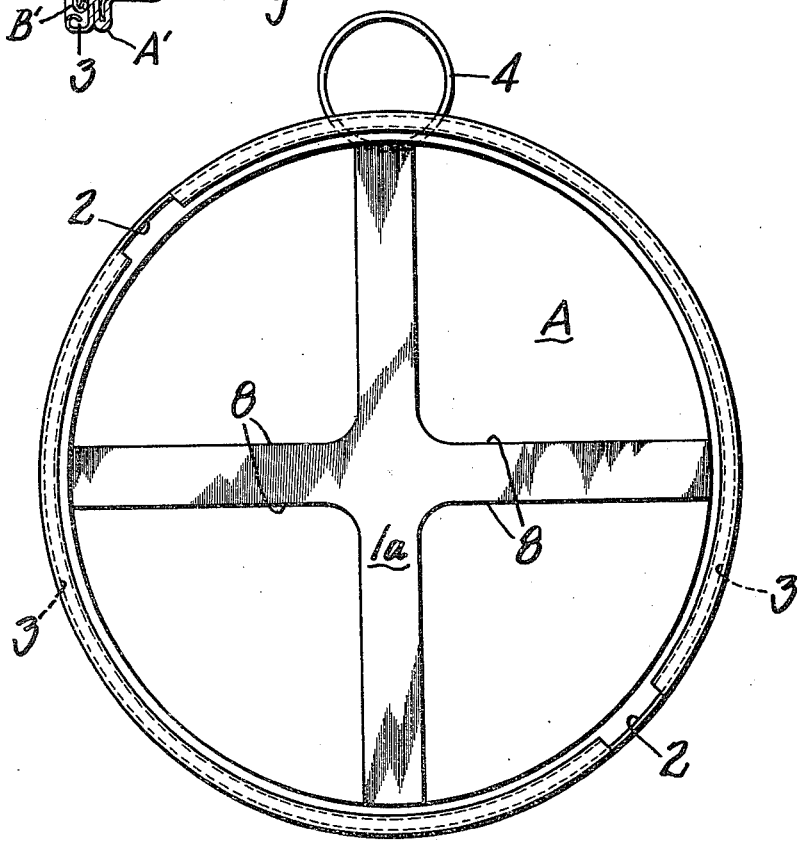

FUMIGATOR FOR MOSQUITO COIL

BACKGROUND OF THE INVENTION

The present invention relates to a fumigator for mosquito coil and, more particularly, to an improved fumigator for mosquito coil composed of a body and a lid which are coupled into a circular receptacle adapted to accommodate an ignited mosquito coil therein for fumigation.

The conventional type fumigators comprise a receptacle made up of a main body of dish shape which serves as an ashtray and a dish-shaped lid which is detachably mountable on the rim of the main body. On the contacting edge surfaces of the body and the lid there are provided a set of holding means for mosquito coil to hold the mosquito coil in suspension therebetween while it keeps burning safely. For such type of fumigators, there have been used, as a coil holding means, a metal plate provided with numerous small projections, a metal plate with a layer of glass fiber bonded thereon, etc.

The fumigator designed to hold a mosquito coil between a pair of metal plates often has such drawbacks that, when the ignited portion of the coil reaches the metal portions gripping the coil from both sides, the coil is given a sharp deheating effect to cause the fire to go out very often, or with the metal plate acting as a heat conductor, the receptacle is heated to an extraordinary high temperature, or further, the spiral coil may be ignited simultaneously at plural spots to make the receptacle even more highly heated to cause a burn or a fire accident. Further, the tar formed by the fumigation of the mosquito coil is liable to adhere to the holding means together with the ash, and such accumulated tar and ash interrupt the fumigation of the subsequent area of the mosquito coil, thus necessitating frequent removal of them. Even the structure having glass fiber bonded on the surface of the metal plate has not been fully successful in overcoming the above defects.

SUMMARY OF THE INVENTION

An object of the present invention is to provide a fumigator for mosquito coil which is capable of holding mosquito coil elastically to prevent the going out of fire, heat transmission, and adhesion and accumulation of tar and ash, etc. and thus to permit smooth and safe burning of mosquito coil, by employing as a means for holding the mosquito coil in the receptacle composed of the dish-shaped body and the lid a pair of glass fiber nets prepared by weaving coarsely in cross directions twisted glass fiber yarns comprising a large number of glass fiber filaments.

Another object of the present invention is to provide a fumigator adapted to prevent the sliding down of the mosquito coil between the holding means during its use in suspended position, by fixing to the central portion of the holding surface of said glass fiber net an incombustible press-holding auxiliary member formed by suitable material in suitable construction, such as a layer or accumulation of asbestos or glass filaments.

A further object of the present invention is to provide a fumigator for mosquito coil which permits easy visibility of the amount of the accumulated ash which becomes a heat medium in the course of fumigation of the mosquito coil and easy ash-removing operation, by using an extremely coarse mesh of glass fiber net to be spread over the edge or rim of the body.

A still further object of the present invention is to provide a fumigator for mosquito coil which prevents separation of the body and the lid by the shock exerted thereon when the receptacle drops down by accident while being used in suspended position, etc., by so constructing that the peripheral edge of the circular body is curled inwardly excepting for parts thereof which oppose in diametrical direction to one another left uncurled, while the peripheral edge of the lid is provided with a pair of hook means at positions opposite to said uncurled parts, said hook means being formed by bending the foremost end of the peripheral edge of the lid upward and adapted to fit into the peripheral groove formed by the curled edge portion of the body to be securely hooked inside said groove.

BRIEF DESCRIPTION OF DRAWING

The drawing shows the preferred embodiments of the present invention, in which FIG. 1 is a front view of the main body, FIG. 2 is a vertical sectional view of the body, FIG. 3 is a front view of a lid, FIG. 4 is a sectional view of the lid along the X-X' line in FIG. 3, and FIG. 5 is a vertical sectional view to show the condition in which the body and the lid are coupled together to hold a mosquito coil of spiral shape therebetween. FIG. 6 is a front view of the body with an incombustible press-holding auxiliary member fixed to the central portion of a glass fiber net, and FIG. 7 is the front view of the body with the glass fiber net of extremely coarse mesh spread thereover under tension.

DETAILED EXPLANATION OF INVENTION

The body A shown in FIG. 1 and FIG. 2 is a thin metal plate press-treated in circular shape to form a bottomed ashtray shape. The upper part of the peripheral wall of the body A is first bent outward and then folded back inwardly to form a U cross-sectional-shaped clamping part A' at the peripheral edge or rim thereof to clamp the edge of a glass fiber net 1a inbetween. Said net 1a is spread over the whole area of the contacting edge surfaces under tension. The upper peripheral edge of the body A is curled inwardly in a roll form to provide an annular peripheral groove 3 except that two portions of said peripheral edge diametrically opposed to each other are left uncurled to form a pair of diametrically opposed catch openings 2. In the drawings, the member 4 is a ring having a portion of it piercing through the peripheral wall of the body A.

The lid B shown in FIG. 3 and FIG. 4 is a thin metal pressed to form into a circular dish shape in the same manner as for the body A. On the upper surface of the lid B are provided a plurality of smoke discharge holes 5, as illustrated. The lid B is, as in the case of the body A, provided at its lower flange portion with a clamping portion B' which has a U-shaped cross-section and in which the peripheral portion of the glass fiber net 1b is inserted to hold said net 1b over the whole area of the edge surface at tension. The lower flange of said lid B is formed into annular shape so as to engage with some elasticity in the inner periphery of the upper flange part of said body A. In the drawing, 6 is a pair of hooks, opposedly provided in diametrical direction, formed by crushing the lower flange (the outer periphery of the clamping portion B' of the lid B and then straightening it outwardly, and 6' is a bent part formed by upwardly bending the foremost end of the hook 6. Said hook 6 may be made by bending a separate metal piece into L-shape and welding a side thereof to the back of the clamping part B' of the lid B. Alternatively, the hook may not be provided with a bent part 6'.

The glass fiber nets 1 spread over the contacting edge surfaces of the dish-shaped body A and the lid B respectively are made by weaving in coarse mesh cross-wise the twisted thread composed of a bundle of glass fiber yarns. Alternatively, the nets may be of ordinary mesh-woven texture. In the illustrated net 1, the size of the thread used is about 0.5 mm and the size of the mesh is about 3 mm.

To use the fumigator of the invention having the above construction, an ignited spiral mosquito coil C is placed on the glass fiber net 1a of the body A disposed horizontally, with the hook 6 of the lid 8 positioned at the coupling opening 2 of the body A, and the lid B is placed on the body A, with the outer periphery of the lower flange of the lid B engaging in the inner periphery of the upper flange of the body A, whereupon the body and the lid are rotated in the circumferential direction while the edges or rims of the two are being held in sliding contact with each other, with the result that, as shown in FIG. 5, the two elements are coupled together to form a receptacle body to hold the mosquito coil C between the net 1a of the body A and the net 1b of the lid B. At this time, with the above rotation, the hook 6 of the lid B slides along from the coupling opening 2 into the peripheral groove 3 of the upper flange of the body A to provide a rigid coupling between the lid B and the body A. The hook 6, even without having the bent part 6' at its edge, is capable of fixing the lid B as long as it is so designed as to engage with the lower flange of the peripheral groove 3.

The present fumigator which is adapted to hold the ignited mosquito incense coil C as above, is used either in suspension by means of the hanging ring 4 or by placement on a floor or a table.

As above, the fumigator of the present invention thus constructed with the glass fiber nets 1 spread on the contacting peripheral surfaces of the dish-shaped body A and the lid B which are coupled in a manner that they can be freely mountable and detachable at their peripheral contacting parts permits easy and secure placement of the mosquito coil C, and because the clamping of the coil C is made between the highly elastic nets 1, it does not cause any breakage of the incense coil. Further, since the incense coil which is fumigated between the two nets 1 is held between the glass fibers which have excellent heat insulating property, no drastic deheating effect is caused to the coil C even when its fumigating portion comes to the portion of contact with the nets 1, and the incense coil is fully fumigated to its end. Also, the ash produced by fumigation falls down through the openings of the meshes of the nets 1 to the side of the body A or, during its use in suspended position, to the side of the lid B, resulting in an extremely small amount of the ash to stay on the holding surface of the coil, thereby giving no interruption to fumigation even in repeated use. Additionally, since the tar which is produced with the fumigation is less liable to adhere to the glass fiber, the fumigator is suitable for repeated uses over a long period without requiring cleaning. Moreover, since the present fumigator in which the glass fiber net is used as the incense coil holding means has excellent heat insulating property as described above, the receptacle is not extraordinarily heated and is especially preventive of the phenomenon in which the spiral shaped mosquito coil is liable to ignite simultaneously at plural spots which has hitherto been frequently observed with its use in suspended position. The fumigator of the invention serves to eliminate the fear of disasters such as burn, fire, etc. resulting from the overheated receptacle.

According to the modified embodiment in FIG. 6, the body A shown therein is similar to that shown in FIG. 1 and FIG. 2. Over its edge surface a glass fiber net 1a is spread in stretched state, and at the central part of the surface of said net 1a is provided an incombustible clamping auxiliary member 7 made by bonding glass fiber or accumulated asbestos. The said clamping auxiliary piece 7 may be provided on the net 1b on the lid side. Said member may be fixed in position by wire and the like.

The net 1 equipped with the clamping auxiliary piece 7 as above has said piece projecting above the holding surface of the mosquito coil C so that it may serve to reinforce the holding force for the central area which is otherwise relatively smaller than at the peripheral part and to prevent the sliding down of the coil especially in the use of the fumigator in suspended state.

Further, the body A shown in FIG. 7 has a construction in which the glass fiber net 1a of extremely fine mesh 8 is used. The net 1a comprises glass fiber bundled, bonded and formed into a cross shape, and each end portion thereof is clamped by the clamping portion A' of the body A. The shape of the mesh 8 of the net 1a may be optionally chosen in radial, cross or other arrangement but the mesh is desirably of the size which facilitates visual observation of the bottom of the body A from outside.

The fumigator having the glass fiber net 1a of a large mesh 8 spread over the edge surface of the body A permits direct visibility of the amount of the old ash accumulated in the body A when the newly ignited mosquito coil C is going to be placed thereupon. Accordingly, it is possible to know the amount of accumulation of ash which is liable to become a heat medium during the use, and there is an effect which induces the user to perceive the danger of fire. Also, at the time of removing the ash in the body A, the large mesh 8 of the receptacle is suitable for easy and effective removal of ash.

The lid B shown in FIG. 3 and FIG. 4, being provided with the hook 6 which includes the upward bent portion 6' at its forward end has said bent portion 6' positioned in the peripheral groove 3 of the body A when coupled together with the body A, as described above. Accordingly, in comparison with the lid B having no bent portion 6' on the hanging hook 6, the present device has excellent shock-proof property.

In other words, when, during the use of the fumigator in suspension, the hanging ring 4 is released from the hook by some accident and the fumigator drops down perpendicularly, an impact by the fall is exerted in the direction of plane on which the body A and the lid B are coupled. This impact force acts first as a force to compress the circular receptacle in vertical direction at the landing and is then converted into a repulsive force inside of the receptacle, and further works in the direction to expand the receptacle body in vertical direction. Accordingly, if the hook 6 is placed at nearly 45° inclination to the horizontal plane, it is in the position at which the distortion to be caused to the receptacle body at fall is the smallest, and the impact force effectively works even on the hook having no bent portion 6', but in the present fumigator which is being used with much frequency by many users, such proper usage is not necessarily excercised.

Accordingly, when the bent portion 6' is provided at the peripheral edge of the hook 6, irrespective of the position of the hook 6 in the circumferential groove 3 of the body A excepting the coupling space 2, the hook-fixing function thereof sufficiently works against the abrupt separation of the lid B and the body A, thereby to prevent unforeseen accidents.

What is claimed is:

1. A fumigator for a mosquito coil comprising a dish-shaped body having a bottom, a cylindrical edge defining a plane, and a body circumferential rim portion;
    a lid having smoke holes therethrough and a lid circumferential rim portion;
    means provided on said body rim portion and said lid rim portion for detachably coupling and hooking the same together; and
    a pair of glass fiber nets, one of which is fixed in tension circumferentially to said body rim portion, the other being circumferentially fixed in tension to said lid rim portion, whereby when said body and said lid are coupled by said means the mosquito coil is held between said pair of glass fiber nets.

2. The fumigator according to claim 1, further comprising a clamping auxiliary member provided at the central portion of the glass fiber nets, said auxiliary member being fixed in such a manner as to project above the net surface whereby the mosquito coil is held from sliding in the direction of said cylindrical edge panel.

3. The fumigator according to claim 1, wherein said one glass fiber net is coarsely meshed and is fixed at tension over the edge plane of the body.

4. The fumigator according to claim 1, wherein said means comprises a pair of hooks formed on the rim portion of the lid at diametrically opposed locations, each of said hooks being provided with an upwardly bent portion at its foremost end and peripheral grooves formed on said rim portion of the body whereby said upwardly bent portions interconnect with said grooves at the time of coupling of the lid and the body to couple and hook the same together.

* * * * *